March 20, 1962  M. WITZENBURG  3,025,832
APPARATUS FOR THE AUTOMATIC FEEDING OF HOGS
Filed March 20, 1959
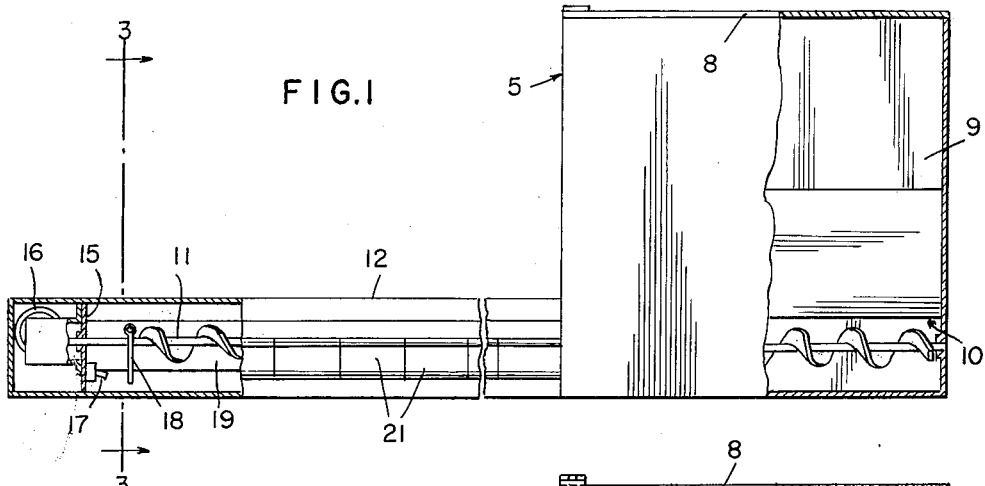
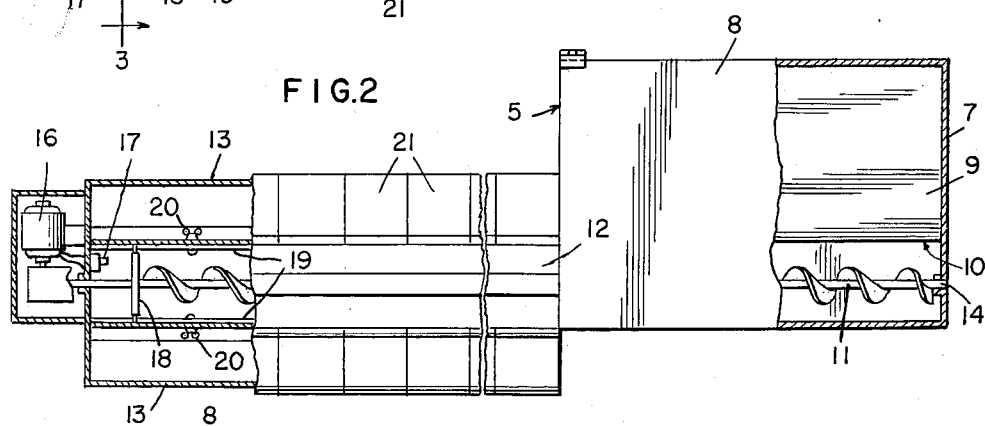
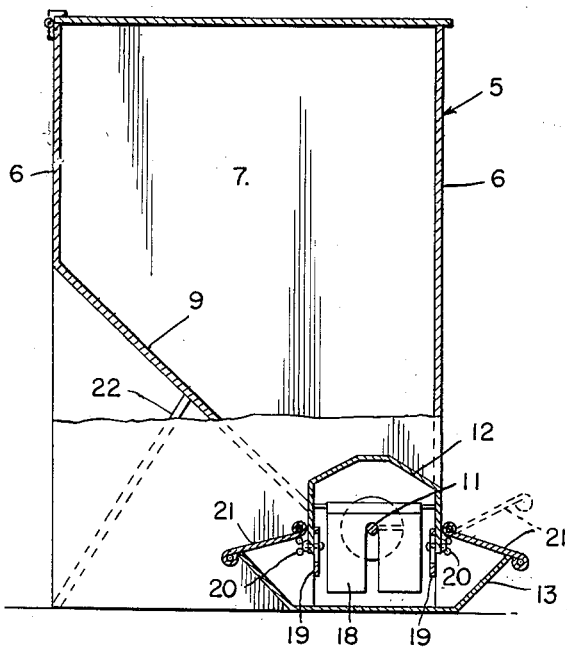
INVENTOR.
Marion Witzenburg
BY
Garvey & Garvey 3,025,832
APPARATUS FOR THE AUTOMATIC
FEEDING OF HOGS
Marion Witzenburg, Dunkerton, Iowa
Filed Mar. 20, 1959, Ser. No. 800,886
3 Claims. (Cl. 119—52)

The present invention is an apparatus and method for the automatic feeding of hogs.

Objects of this invention are to provide an apparatus and method which will effect free uninterrupted flow of feed from a source of supply to a multiplicity of feed troughs parallelly arranged and serviced by a common conduit through which latter the feed is positively urged in uniform quantities to the troughs by suitable power means; to provide a cutoff for the power means which automatically operates under pressure of feed in the conduit when the feed reaches the terminal of the conduit remote from the source of supply; and to provide an adjustable feed level for each side of the conduit to regulate the amount of feed passing into the trough of each parallel row.

A further object is to provide a method for supplying feed to hogs in a manner to furnish parallel rows of troughs with selective measured quantities of feed from a common source of supply.

A still further object of the invention is to provide a very simple relatively inexpensive feeder constructed and arranged to be self-stabilizing and completely enclosed to protect the feed from the elements at all times.

Other objects of the invention will be manifest from the following description of the present preferred form of the invention, taken in connection with the accompanying drawing, wherein:

FIG. 1 is a fragmentary side elevational view of an automatic hog feeder constructed in accordance with this invention, parts being broken away to disclose details;

FIG. 2 is a top plan view of the same; and

FIG. 3 is a vertical sectional view taken on the line 3—3 of FIG. 1 and looking in the direction of the arrows.

The device of this invention includes a hog feeder assembly comprising a bin 5 which in vertical section is preferably of the construction shown in FIG. 3 of the drawings comprising side walls 6, end walls 7 and a hinge closure 8. One of the side walls 6 is bent inwardly to provide a sloping wall 9 which terminates a distance above the bottom of the bin to provide an opening 10. The opening 10 extends across the bottom of the bin and opens through one of the end walls 7. The opening 10 is adapted for the reception of one end of a feed auger 11, the opposite end of the auger extending through the bin, as shown in the drawings, and being housed in a conduit 12, as illustrated to advantage in FIG. 3. The conduit 12 is of any desired length and is in communication with, and secured to, a pair of parallel rows of troughs 13. One end of the auger 11 is journaled in an end of the bin 5, as indicated at 14, the opposite end of the auger extending through a partition 15 of the conduit and in operative engagement with an electric motor 16. Mounted on the partition 15 is a control switch 17 which is in circuit with the motor 16. Mounted in the conduit 12 is a cutoff 18 which is adapted to be moved, under pressure of feed in the conduit, in a manner more fully hereinafter described, to engage the switch 17 for automatic cutoff of the motor 16. The cutoff may consist of a pivoted plate or the like mounted as shown to advantage in FIG. 3.

In order to adjust the feed level in the troughs 13, a plate 19 is mounted on each side of the conduit, also shown to advantage in FIG. 3, the plate being held in desired adjusted position by a butterfly nut 20, or the like. This permits adjustment of the space between the bottom of the troughs in an obvious manner.

Each of the troughs 13 is provided with a plurality of hog-operated, angularly disposed, closures 21 to provide in effect individual feeding stations for the hogs, the closures automatically gravitating into engagement with the tops of the troughs when the head of the pig is removed from the latter in a manner well known in the art.

In order to effectively support the sloping wall 9 of the bin 5, a brace 22 is provided mounted substantially as shown in FIG. 3 of the drawing.

In use of this device, feed is introduced into the top of the bin 5 in an obvious manner and permitted to gravitate therein to the restricted opening 10 in the bottom of the bin by reason of the slopping wall 9. The auger 11, being rotated by motor 16, causes the feed to be carried into the conduit 12 for passage into the parallel rows of troughs 13. The amount of feed passing into the troughs is measured by the position of the plates 19. The construction of the tops of the troughs with the closures 21 provide individual feeding stations for the hogs with obvious beneficial results. When the feed column extends the full length of the conduit 12, the cutoff plate 18 is moved into engagement with the motor control switch 17 to automatically turn off the power and correspondingly stop rotation of the auger. When a sufficient quantity of the feed has been consumed from the troughs 13 to relieve pressure on the cutoff plate 18, the latter will gravitate into a vertical position, as shown in the drawing, which correspondingly releases the control switch 17 permitting reactivation of the auger 11 through the motor 16.

While I have herein described and shown a preferred embodiment of my invention, it is nevertheless to be understood that various changes may be made therein, without departing from the spirit and scope of the claims hereto appended.

What I claim is:

1. Apparatus for the feeding of hogs and other farm animals comprising an elongated trough, a feed advancing augar in said trough extending longitudinally thereof and spaced above the bottom thereof, and feed confining means on each side of said auger extending substantially the length of said trough and spaced from the bottom thereof to enable a portion of the feed advanced by said auger to pass under said confining means and thus be available to animals along either side of said trough.

2. The apparatus of claim 1 wherein the feed confining means is adjustable to control the volume of feed passing thereunder to animals along either side of the trough.

3. The apparatus of claim 1 with the addition of means in operative connection with the auger to stop the latter when a predetermined quantity of feed has been advanced, by the auger, in the trough.

References Cited in the file of this patent

UNITED STATES PATENTS

| | | |
|---|---|---|
| 2,522,449 | Inman | Sept. 12, 1950 |
| 2,646,023 | Virgil | July 21, 1953 |
| 2,661,720 | Rysdon et al. | Dec. 8, 1953 |
| 2,745,381 | Wallace et al. | May 15, 1956 |
| 2,867,314 | Hansen | Jan. 6, 1959 |
| 2,926,629 | Hazen | Mar. 1, 1960 |